Dec. 14, 1948.                    C. W. MUSSER                    2,456,011
                     APPARATUS FOR ALIGNING PREENGRAVED
                        PROJECTILES IN RIFLED FIREARMS
Filed July 17, 1945                                      5 Sheets-Sheet 1

Fig. 1.

Inventor
CLARENCE W. MUSSER
By J. H. Church & H. E. Thibodeau
Attorney

Dec. 14, 1948.  
C. W. MUSSER  
APPARATUS FOR ALIGNING PREENGRAVED  
PROJECTILES IN RIFLED FIREARMS  
2,456,011

Filed July 17, 1945

Inventor  
CLARENCE W. MUSSER  
By J. H. Church & H. E. Thibodeau  
Attorney

Dec. 14, 1948. C. W. MUSSER 2,456,011
APPARATUS FOR ALIGNING PREENGRAVED
PROJECTILES IN RIFLED FIREARMS
Filed July 17, 1945 5 Sheets-Sheet 5

Inventor
CLARENCE W. MUSSER
By J. H. Church & H. E. Thibodeau
Attorneys

Patented Dec. 14, 1948

2,456,011

UNITED STATES PATENT OFFICE 2,456,011

APPARATUS FOR ALIGNING PREENGRAVED PROJECTILES IN RIFLED FIREARMS

Clarence Walton Musser, Philadelphia, Pa.

Application July 17, 1945, Serial No. 605,614

10 Claims. (Cl. 89—1.7)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to the insertion of pre-engraved projectiles into rifled gun barrels and it has special reference to means operative during such insertion for bringing the projectile engravings into correct register with the lands and grooves of the barrel's rifling.

Broadly stated, the object of my invention is to simplify the insertion of pre-engraved projectiles into the rifled barrels of both breech loading and muzzle loading firearms.

A more specific object is to diminish the effort and time required to effect such insertion.

A further object is to make pre-engraved projectiles more readily useable in rifled weapons of the automatic reloading type.

A further object is to impart to pre-engraved projectiles the capability of engaging a gun's rifling in instantaneous alignment and without necessitating special rotative manipulation.

A still further object is to provide a unique method and novel apparatus for accomplishing the foregoing.

In practicing my invention I attain the stated and other objects by supplementing pre-engraved projectiles of conventional construction with novel indexing detents which engage the barrel's spiral rifling grooves and thereby lead the projectile's preengraved teeth into those grooves in the automatic and uniquely effective manner presently to be described. Preferred forms and illustrative applications of such detents are shown by the accompanying drawings wherein.

*Firearms and ammunition with which improvement is useable*

Pre-engraved projectiles for rifled weapons of a wide variety of types and calibers may be benefited by my improved self-indexing mechanism. The projectile and breech loading firearm of Figs. 1 to 11 are illustrative of these. The firearm there represented is a 75 mm. recoilless weapon duplicating that shown and described by Kroeger-Musser patent application Ser. 577,830 filed February 14, 1945 for "Recoilless firearm and ammunition therefor."

The barrel 32 thereof has an inside diameter of approximately 3 inches, and is rifled to secure the usual gains in accuracy and range which a spinning of the projectile in flight makes possible. The rifling represented has a right hand twist of one turn in 22 calibers (or approximately 65 inches of barrel 32) and utilizes the twenty-eight lands 33 with intervening grooves 34 which the drawings hereof show.

As the description proceeds it will become apparent that my improvements also are useable with pre-engraved projectiles designed for firing from muzzle loading as well as breech loading firearms, or for barrels either larger or smaller than 75 mm., or for barrels that utilize steepnesses of rifling twist other than one turn in 22 calibers, or that have twists in the left hand direction instead of the right, or that utilize either more or less than 28 lands with 28 intervening grooves. Such rifled barrels may, moreover, form a part of firearms of any conventional or special type and hence need not be restricted to the recoilless type here shown as including a tapered open-breech chamber 46.

The accompanying ammunition round here illustratively shown is designed for use with the 75 mm. recoilless firearm just described. It comprises a pre-engraved projectile 20 insertable into rifled barrel 32 plus a cartridge case 26 perforated in the manner and for the purpose stated by Kroeger-Musser application Ser. 577,830 and by an earlier Kroeger-Musser application Serial No. 536,590, now abandoned, filed May 20, 1944, for "Recoilless firearms, ammunition therefore and ballistic design thereof." This complete round has an overall length of about 28 inches (of which approximately 13 inches are in the projectile 20) and a total weight of about 22 pounds (of which approximately 15 pounds are in the projectile).

Figure 10:
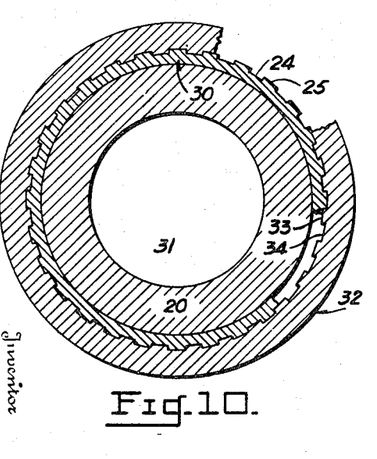
Fig. 10 is a section on line 10—10 through the so indexed rotating band of Fig. 9 enlarged and completed to represent the entire barrel circumference.

The represented projectile 20 makes use of a rotating band 30 pre-engraved to assure more ready passage of the projectile through barrel 32's rifled bore. This band may be conventional in all respects; it is shown as being located close to the projectile body's rear; and it has cut therein twenty-eight grooves 24 spaced to accommodate the twenty-eight lands 33 of barrel 32, as shown by Fig. 10. The intervening band teeth 25 similarly mate with the twenty-eight barrel grooves 34 when the projectile has been fully loaded into the barrel.

This illustrative projectile 20 further makes use of a bourrelet 21 encircling the projectile body relatively close to the body's forward nose. This bourrelet is spaced from the rear rotating band by a center-line to center-line distance of the order of four and one-half inches. For the illustrative barrel rifling twist of one turn in 22 calibers (or about 65 inches of barrel 32) such an axial spacing corresponds to about $\frac{1}{13}$ of a rifling rotation. This means that an axial advance of four and one-half inches through barrel 32 will cross two of the spiral lands 33 and two of the spiral grooves 34.

As the description proceeds it will become apparent that my self-indexing improvements also are useable with pre-engraved projectiles for firearms of the muzzle loading as well as the breech loading type, or forming parts of ammunition other than perforated case-type shown, or having calibers either larger or smaller than 75 mm., or that carry the pre-engravings directly on the projectile body (rear portion for breech loading and forward portion for muzzle loading) instead of on a separate rotating band, or that have bourrelet-to-rotating band spacings either greater or less than four and one-half inches, or that have no well defined bourrelets, or that are designed for use in barrels rifled with either more or less than 28 lands and 28 grooves, or that are designed for use in barrels having steepnesses and directions of twist which differ from those here shown.

*The problem to be solved*

As co-pending Kroeger-Musser application Serial No. 536,590 more fully brings out, pre-engraving of projectiles tends to increase the overall efficiency of the weapons in which they are used. Important advantages include a lowering of the force needed to advance the projectile through the barrel plus elimination of engraving pressures behind the projectile and of attendant "swedging" erosion of the bore's lands. In the case of illustratively shown recoilless type weapons, which are fast becoming highly important for military use, projectile pre-engraving is especially valuable as it makes complete recoil neutralization relatively more easy and reliable.

Heretofore, however, these obvious advantages of pre-engraved projectiles have been attended by substantial extra time and effort required to load same into rifled barrels. In military gunnery, particularly, loading time and effort are of paramount importance and must be minimized before full benefit of the pre-engraving virtues can be realized.

Specifically, the handicap heretofore suffered by pre-engraved projectiles has been the necessity for matching the projectile's engraved teeth and grooves with the complementary grooves and lands of the barrel's rifling. The process of effecting this registration is time consuming and in the heat of battle may be most troublesome. Moreover, this registration requirement has thus far precluded widespread use of pre-engraved projectiles in weapons of the automatic reloading type.

What is needed, therefore, and what my here disclosed invention has supplied, are indexing facilities which are self-aligning and automatic, and which may always be relied upon to lead the engraved portion of the projectile into accurate registry with the barrel's riflings.

*"Button" type detents applied to breech loading projectiles*

In the illustrative construction for breech loading use which Figs. 1 through 11 show, my new projectile aligning mechanism takes the form of two indexing buttons 28—28' projected from the bourrelet 21 at a rotative separation of 180° and at a forward axial spacing from rotating band 30 of about four and one-half inches. These buttons may satisfactorily be made of a relatively soft metal, such as brass, and each may satisfactorily be mounted upon a washer 29 of compressible rubber or other material that imparts radial resilience to the button support. One highly practical form of such mounting is illustrated by Figs. 4-5, 7-8.

As will be more fully brought out presently, these two simple and inexpensive rotative positioning buttons 28—28' are capable of automatically indexing the engravings on projectile 20's rotating band 30 into accurate registry with the rifling of barrel 32 instantaneously upon forward thrust of the projectile into the barrel and without necessitating special rotative manipulation. Since the illustrative complete 75 mm. ammunition round thus rotatively positioned weighs over 20 pounds, an exceedingly high degree of effectiveness is achieved.

*Operation of self-aligning indexing detents*

Loading pre-engraved projectiles bearing my herein described indexing detent improvement is a relatively simple and automatic process. To effect this loading, a gunner merely thrusts the complete round into the gun chamber 46 (see Fig. 1), and then forwardly rams the projectile home in the gun barrel 32 (see Fig. 9) by exerting simple axial pressure on the head of the round's cartridge case 26.

Figure 1:
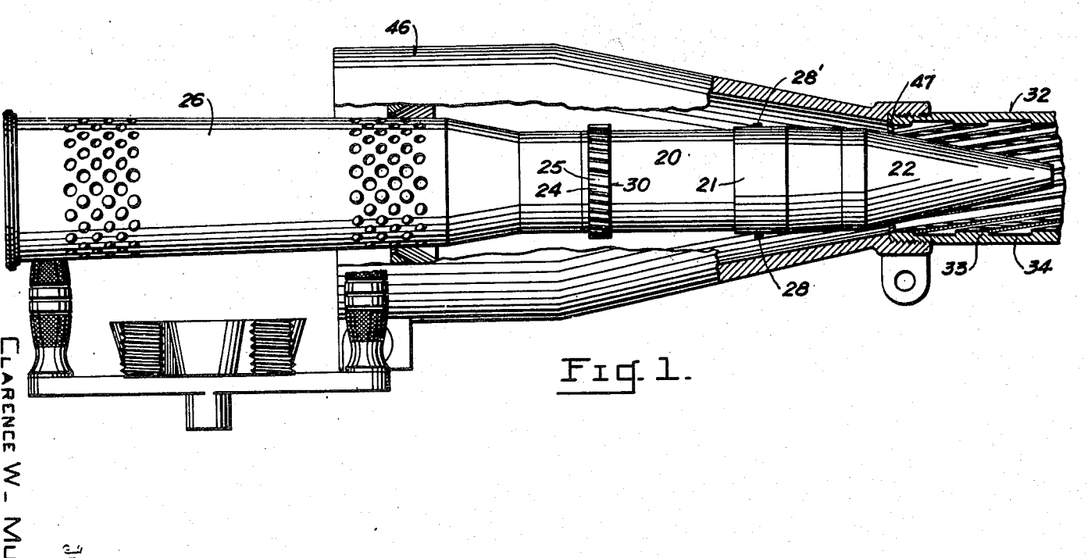
Fig. 1 represents indexer detents of a "button" type applied in accordance with my invention to a pre-engraved projectile which is designed for use with breech loading firearms and which is shown about to be inserted into the rifled barrel of a breech loading gun.
Figure 2:
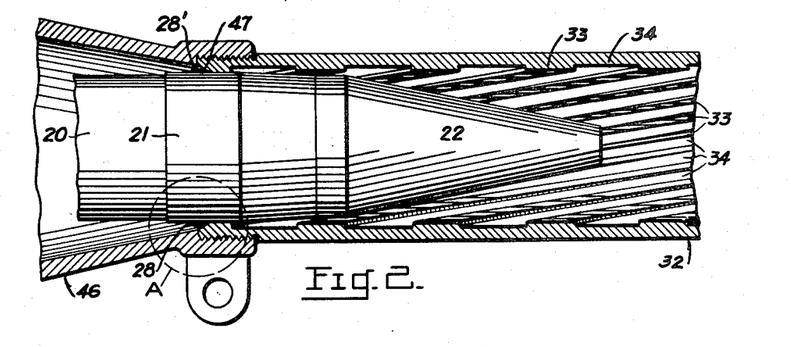
Fig. 2 is a showing (somewhat enlarged) of the indexing "buttons" of Fig. 1 partially compressed into the projectile wall by contact with a chamfered rim which leads into the rifled barrel.
Figure 3:
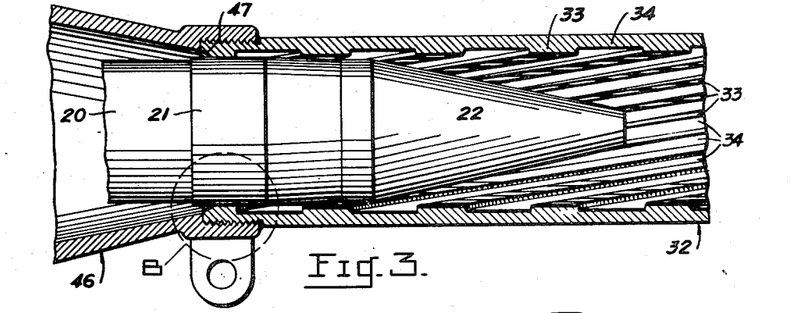
Fig. 3 similarly represents the Fig. 1 indexing buttons entirely compressed into the projectile wall due to contact with opposing rifling lands as occasioned by projectile advancement into the barrel.
Figure 4:
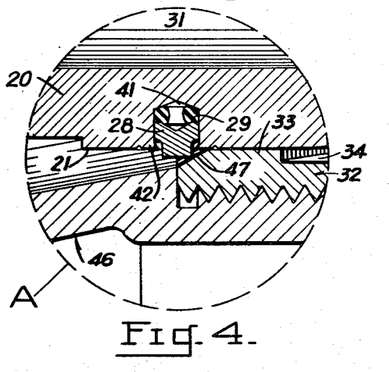
Fig. 4 reproduces area A of Fig. 2 in section and to enlarged scale and shows the constructional details of one of the indexing buttons when same is partially compressed into the projectile.

In the course of thus inserting the projectile in the barrel, the indexing detents 28—28' contact the chamfered rim portion 47 of barrel 32 (see Figs. 1 to 5, 6 and 9) and are thereby partially compressed inwardly as shown in Fig. 4. Should the detents immediately index rifling grooves 34 upon entering the barrel 32, return to their previous extended position immediately occurs, concomitantly resulting in button-to-groove registration, as shown in Figs. 6-7-8.

Figure 5:
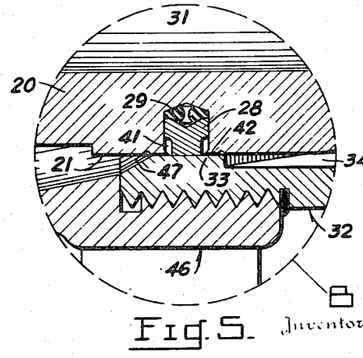
Fig. 5 similarly reproduces area B of Fig. 3 and shows details of the indexing button when same is fully compressed into the projectile.
Figures 6, 7, 8:
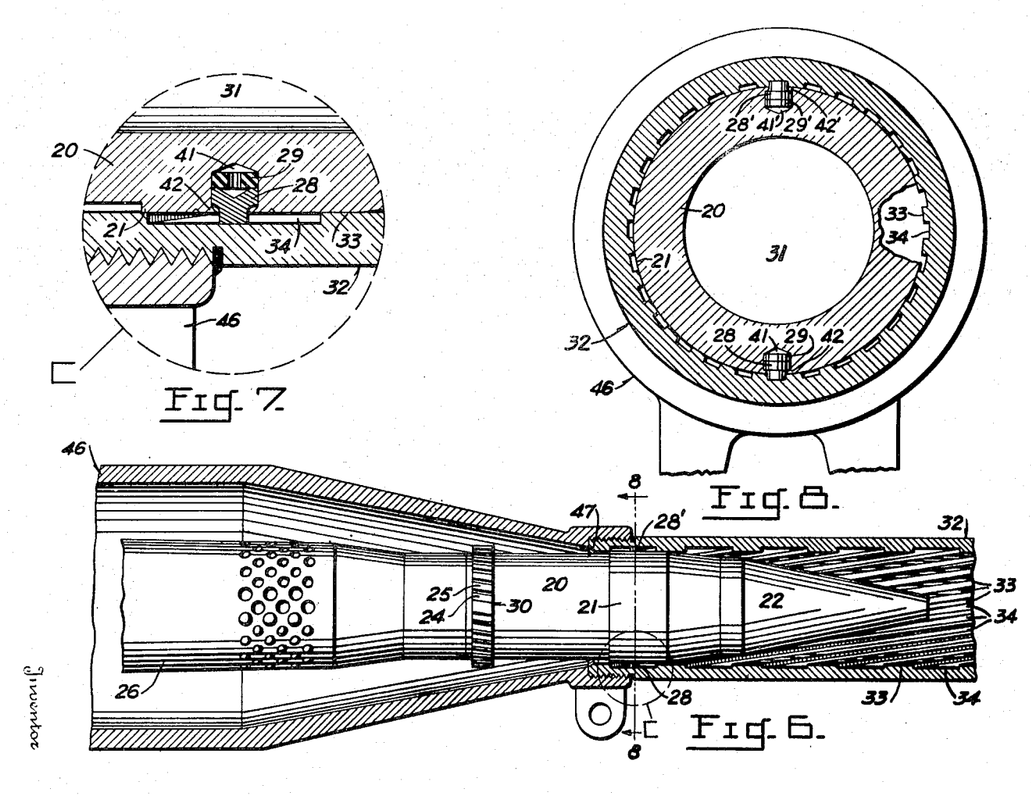
Fig. 6 shows the indexing buttons of the earlier figures re-extended into register with spiral rifling grooves as occasioned by still further projectile advancement into the barrel.
Fig. 7 reproduces area C of Fig. 6 in section and to enlarged scale and shows details of one of the indexing buttons when same is fully re-extended into the rifling groove.
Fig. 8 is a section on line 8—8 through the two groove-registered indexer buttons of Fig. 6 enlarged and completed to represent the entire barrel circumference.

Should, however, the detents 28—28' first meet spiral lands 33 upon entering barrel 32, total inward compression of the detents occurs, as shown by Figs. 3 and 5, as they ride on the respective lands so contacted. This state continues until the forward movement of the projectile brings the detents 28—28' opposite corresponding spiral grooves 34. Immediately, then, the detents are forced to re-extend outwardly under pressure exerted by the resilient washers 29—29', resulting in detent-to-groove registration at that particular point in the barrel 32, as represented by Figs. 6-7-8.

Figure 11:
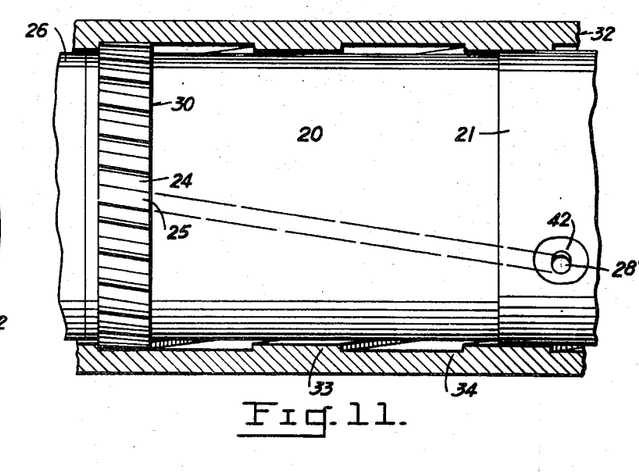
Fig. 11 is an enlarged view from line 11—11 of Fig. 9 with such different portion of the barrel removed as to show one of the projectile's forward indexer buttons and the pre-engraved projectile's rear tooth that is aligned therewith along the path of a registering rifling groove (shown by broken lines)

Upon such registration of detents 28—28' with rifling grooves 34, forward progress of the projectile in barrel 32 will be a spiral motion. The attendant projectile rotation is effected by the action of the detents 28—28' following in the tracks of spiral grooves 34, as indicated by Fig. 11. These detents are spirally aligned with rotating-band teeth as later described.

Figure 9:
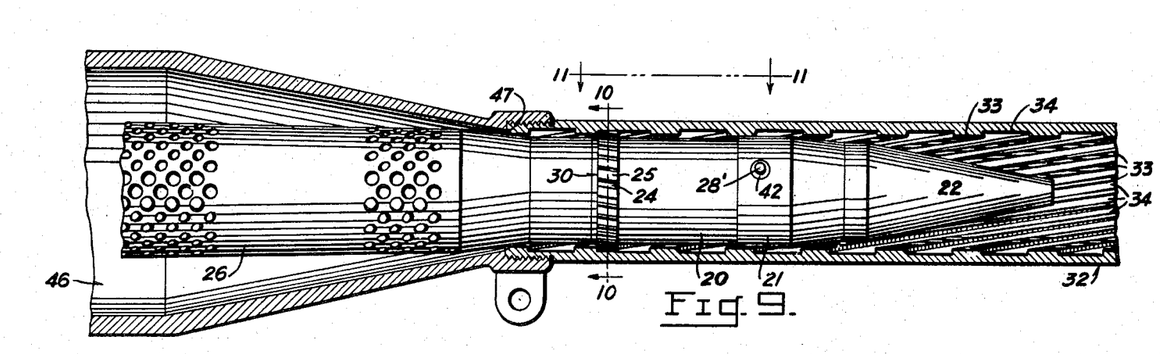
Fig. 9 illustrates the accompanying registration of the projectile's rotating band with the barrel rifling which the indexing buttons automatically effect upon full forward thrust of the projectile into the ammunition's firing position.

In consequence, upon reaching the entrance to barrel 32, the projectile's rear pre-engraved rotating band 30 will be properly positioned so that its teeth 25 and grooves 24 accurately align with the rifling grooves 34 and lands 33, respectively. Registry of the pre-engraved band 30 with the riflings of barrel 32 takes place immediately thereafter, as represented by Figs. 9-10. The thus-loaded projectile 20 is then ready for firing.

The just explained automatic operation of my "detent indexer" facilities thus effects the desired matching of projectile engravings 24—25 with the barrel riflings 33—34 without the special manipulations and time consuming efforts which heretofore have been an accepted "necessary evil" in the use of pre-engraved projectiles.

*Construction and installation of "button" type indexing detents*

In my well tested and successful product of Figs. 1 to 11 that is adapted for 75 mm. use, I have mounted each indexer button 28—28' in a projectile side wall hole of the type which Figs. 4-5, 7-8 illustrate at 41—41'. In the 75 mm. projectile represented, each of these holes 41—41' is approximately one quarter inch in diameter, has a depth of the general order shown, and its base is cone shaped (included angle of about 140°) for a purpose later to be made evident.

Within each hole 41—41' I place a ring shaped washer 29—29' of resilient material (such as of "neoprene" rubber) in contact with the cone-shaped base thereof, as shown by Figs. 7-8 (also Figs. 4-5). For the 75 mm. projectile represented, each of these washers has an outside diameter of slightly less than one-quarter inch, an inside diameter of about one-eighth inch, and a thickness of less than one-eighth inch.

The index button 28 or 28' is next inserted into hole 41 or 41' to rest upon the resilient washer 29 or 29'. Each of these buttons is preferably made of a relatively soft metal such as brass and has the shape illustratively shown in Figs. 4-5, 7-8, 11 as including an outer narrow portion integrally joined with an expanded inner portion. The protruding stud-like outer portion has a diameter of approximately 0.181 inch and a length of about 0.058 inch. The first of these dimensions is slightly less than the width of rifling grooves 34 into which the button is at times protruded, as shown by Figs. 6-7-8.

Each index button's expanded inner portion is at all times positioned within hole 41 in the projectile's wall, as shown by Figs. 4-5, 7-8. This expanded inner button part has an outside diameter slidably mating with the inner wall of the quarter-inch hole 41, is of sufficient length to resist sidewise or tipping movement with respect to the hole, and has a base that is cone-shaped (included angle of about 120°) concavely as shown by Figs. 4-5, 7.

When the index button 28 is placed in hole 41 upon resilient washer 29 (much as in Fig. 7), the juncture of the outer narrow and inner expanded portions is about flush with the projectile's outside wall surface. By means of a circular punch (not shown), having a concavity which fits over the button's projecting end, the projectile metal which rims hole 41 at this surface is crimped in about the expanded inner lip of button 28 as indicated at 42 in Figs. 4-5, 7-8, 9, 11. This circular crimp 42 thereafter prevents button 28 from falling out of hole 41, and leaves only the narrower portion of the button projecting from the projectile wall.

This outward projection on the part of each button 28—28' results from a continuous expansive urge by the resilient washer 29 or 29' that is compressed beneath the button base. At different times this washer compression has the varying degrees respectively indicated by Figs. 7, 4 and 5. Button 28 freely slides in projectile wall hole 41 and thereby quickly expands in going from the Fig. 5 condition to the Fig. 7 condition.

The dimensions stated for the indexing buttons 28—28', washer 29—29' and holes 41—41' in which these parts are placed will of course vary with different caliber guns and the measurements of a particular weapon's riflings. The narrowmost projecting portion of these buttons will, however, always be of a diameter which can enable the buttons readily to fall into and traverse the grooves 34 of the rifling for which the projectile is intended.

*Positioning and number of indexing detents*

As already indicated, the two represented indexer detents 28—28' are illustratively shown as projecting radially from the bourrelet 21 which is the forwardmost untapered portion of the projectile body 20. When so installed on the projectile for resilient compression thereinto, these unique index detents function correctly to register the projectile's pre-engraved portion 24—25 with barrel 32's riflings 33—34 when the projectile is thrust into its proper firing position inside barrel 32, as shown in Fig. 9.

These indexer detents 28 perform their intended function with positive reliability when suitably spaced from the projectile's engraved portion, as will later be qualified. Mounting thereof at the illustrated location where the projectile's outside diameter is only slightly less than barrel 32's inside diameter also is preferable but not absolutely essential. Thus, the presence of a bourrelet 21 on the projectile body as here illustrated is not necessary to the effective operation of my invention.

No restrictions other than economy of manufacture limit the number of indexing detents which may be used. For the illustrative 75 mm. projectile shown this number may vary from one to twenty eight. Tests show that one is sufficient; however, for purposes of added reliability the illustrated two are preferable. Even larger caliber projectiles, such as 105 mm., have likewise been indexed correctly and reliably by a single pair of detents.

*Spacing of indexing detents from projectile pre-engravings*

As previously indicated, the axial spacing between the forward indexing detents 28 and the rear pre-engravings 24—25 may be either greater or less than the four and one-half inch separation illustratively described for the represented 75 mm. projectile 20. While there is no limitation to the maximum amount of such axial spacing, it will be seen that there is a minimum separation distance below which my indexing detents may not always operate in their intended manner. This minimum distance between rear engravings 24—25 and forward indexing detents 28 must in all cases be sufficient to assure that the detents will register with spiral rifling grooves 34 and thereby index those engravings for similar registration before same have been forwardly advanced to rifled barrel 32's rear or loading end.

It will be apparent that the most difficult indexing situation arises when the index detents 28 chance to first contact the raised surfaces of lands 33 upon initially entering the rear or loading end of the rifled barrel 32. Under this condition the projectile will be required to travel forward its greatest lengthwise distance before the axially advancing buttons move away from the spiral lands 33 initially contacted and expand into registration with adjoining spiral barrel grooves 34. In such a case, the necessary axial spacing between the engravings 24—25 and the detents 28—28' must be no less than the axial distance required for the rifling helix pattern to be repeated in the same plane.

This requirement may be further clarified by citing the illustrative 75 mm. recoilless rifle and the represented projectile 20 as an example. This weapon's barrel 32 utilizes 28 lands and 28 grooves rifled with a twist of one turn in 22 calibers or 65 inches of the barrel length. For the projectile indexing detents 28 to register with the first spiral groove 34 encountered in the above-mentioned "most difficult indexing situation," the leading edge of each detent must pass completely over one spiral land 33 and into the adjoining spiral groove 34. The necessary axial distance required to be traversed by the detent can be shown to be equal to 65 inches multiplied by the fraction of $2/56$ ($=1/28$) or approximately two and one-third inches.

From this example it will be evident that the greater the number of lands and grooves in a barrel that is rifled with a given twist, the less will be the axial spacing required between the projectile's rear pre-engravings 24—25 and the forward index buttons 28, and vice versa. Similarly, in a barrel having a given number of lands and grooves, the stated minimum spacing will diminish as the steepness of twist is increased, and vice versa. Thus, the named minimum spacing requirement will vary according to both of the stated factors. Both of those factors must therefore be considered in selecting the placement positions for the index detents upon a pre-engraved projectile which is to be used in a particular rifled barrel.

*Establishing rotative location of indexing detents*

To properly locate the index detents 28 on the projectile as required, in accordance with the foregoing and other considerations, for correct projectile engravings-to-riflings registry, I have developed an exceedingly simple but highly effective apparatus. This apparatus (not shown) consists of a hollow metal cylindrical fixture having one end closed off and having a length roughly equivalent to that of the projectile's untapered portion.

The bore of this cylinder simulates that of the rifle in which the projectile is to be used, having the same internal diameter and rifling grooves 34 and lands 33. In fact, a complete cylindrical section of an actual rifle barrel may be used for this purpose. In one satisfactory arrangement, this fixture is horizontally mounted so as to be rotatable in a supporting stand which is capable of being clamped to the work table of a drill press.

The projectile is fitted into this cylindrical fixture, base or rear end first to rest against the cylinder's closed end. In so doing, the projectile's pre-engraved portion 24—25 is placed in respective interlocking alignment with the cylinder's riflings. Thus, this pre-engraved portion being the form of a helix which matches the spiralled riflings, its grooves 24 will mate with rifling lands 33; and its teeth 25 will engage rifling grooves 34.

Were these pre-engraved, helically cut grooves 24 and teeth 25 to be extended the full length of projectile body 20 and the bourrelet 21, as indicated by Fig. 11, this interlocking alignment would likewise be continued. While no such extensions are used or even required, it will be apparent that my indexing detents 28 must be located on the projectile wall at some point on the helical paths which would be taken by such extensions of the pre-engraved teeth 25 in order to accomplish registration with rifling grooves 34.

Preferably, too, the indexing detents 28 should be placed substantially ahead of the projectile's pre-engraved portion, such as on the bourrelet 21, in order that the engravings can be properly indexed with the spiral riflings before the engraved portion 33 actually enters the barrel 32. For this purpose the four and one-half inch spacing illustratively named has been shown to be more than ample (a minimum of two and one-third inches would suffice) for projectiles designed to be used with the 75 mm. barrel represented at 32.

When the projectile is established in the cylindrical fixture as earlier described, the supporting stand is bolted to the drill press table in a position which permits a drill to penetrate a guide hole that extends through the cylinder wall. This guide hole is situated so as to exactly intersect the center-line of a helical rifling groove 34 immediately therebeneath (see Fig. 11).

Through this guide hole the drill is directed to form the hole 41 (see Figs. 4-5, 7-8, 9, 11) in which the index button 28 is to be placed. Since the guide hole cuts through the center-line of a barrel rifling groove 34, the resultant hole 41 drilled in the projectile's wall will intersect the center-line of the helical path representing an extension of the engraved tooth 25 which mates with that rifling groove (as was previously outlined). It follows, therefore, that the index button 28 later positioned in this hole 41 will likewise mate or register with that and all the other equivalent dimensioned rifling grooves 34.

The number of indexing buttons to be used is optional, as previously indicated. Although a minimum of two is preferable, more or less may be employed as desired, limited only by economy and the number of rifling grooves 34 with which they are to register. For drilling the number of holes desired, the earlier described rotatable fixture is equipped with a convenient braking device which enables the fixture to be kept stationary during the drilling operation. In addition, each guide-hole on the cylindrical fixture is indexed so that its exact position may be duplicated without error.

*Use of indexer on muzzle loading projectiles*

Although the automatic indexer facilities of my invention will find many applications with breech-loading weapons and ammunition such as Figs. 1 through 11 typify, use of these facilities is not limited thereto. By simply interchanging the indexer and pre-engraving locations on the projectile, same may be adapted for use in muzzle loading guns.

Figures 12, 13, 14, 15, 16A, 16B, 17, 18:
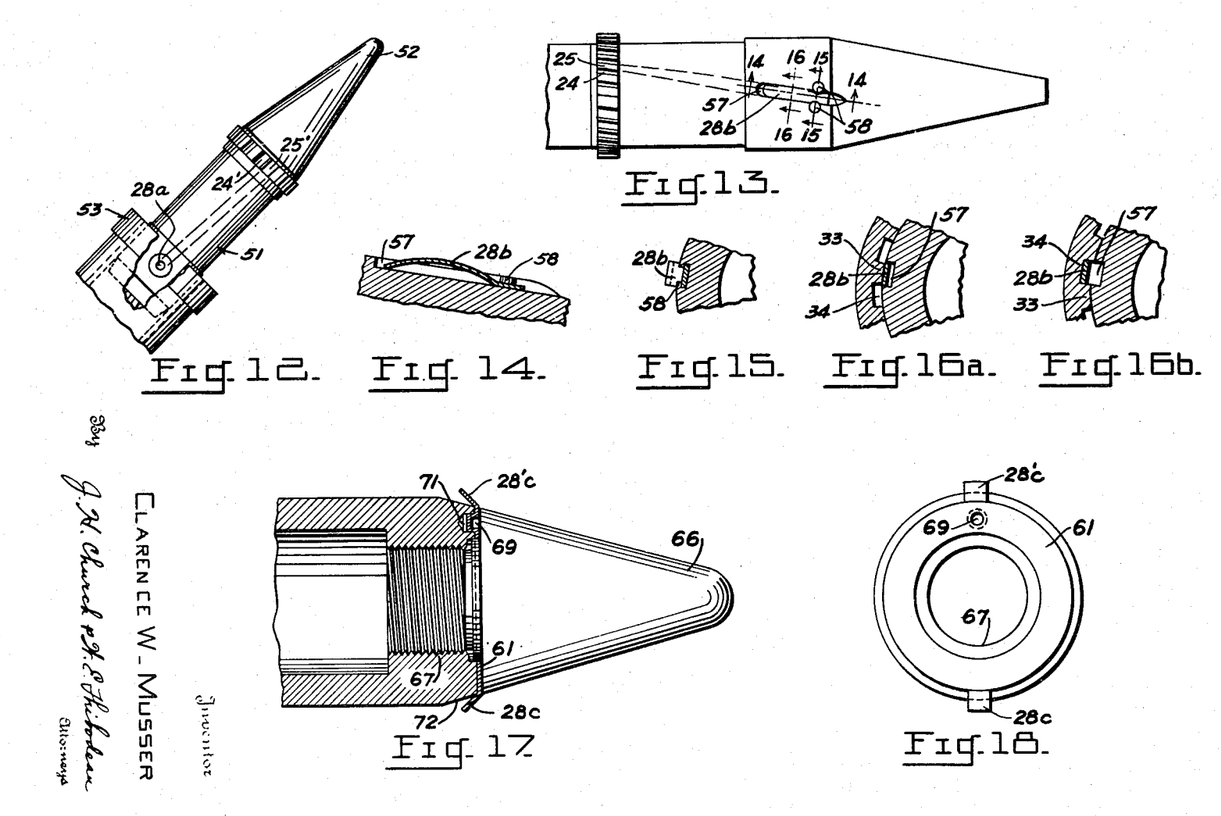
Fig. 12 shows "button" type indexer detents of the earlier figures applied in accordance with my invention to a pre-engraved projectile which is designed for use with muzzle loading weapons such as mortars and which is shown about to be inserted into the muzzle end of a rifled mortar barrel.
Fig. 13 represents indexer detents of a "leaf spring" design which are applicable to projectiles of either the breech loading or the muzzle loading type but which are shown as installed on a breech loading projectile such as Figs. 1 to 11 illustrate.
Fig. 14 is an enlarged longitudinal section from line 14—14 of Fig. 13 showing how each leaf spring detent resiliently protrudes from the projectile wall.
Fig. 15 is an enlarged section from line 15—15 of Fig. 13 showing one manner of securing each detent spring into its mounting slot.
Fig. 16a is a similar section from Fig. 13's line 16—16 supplemented by part of a rifled barrel and showing compression of the indexer detent spring into its mounting slot due to contact with a rifling land.
Fig. 16b modifies Fig. 16a to show re-extension of the leaf spring detent into registry with a barrel rifling groove.
Fig. 17 represents indexer detents of a "resilient ear" design which are applicable to projectiles of either the breech loading or the muzzle loading type but which are shown as installed on a breech loading projectile of detachable-nose construction.
Fig. 18 is a frontal view from line 18—18 of Fig. 17 with the projectile nose piece removed to show further details of the resilient metal ring from whose periphery the ear detents extend.

Reference to Fig. 12 will show my indexer improvement thus applied to a pre-engraved projectile used in a mortar, a muzzle loading weapon. the only modification over breech loading projectiles required is there shown to be a reversal of the relative positions of the indexer detents 28a and the pre-engraved portion 24'—25' on the projectile 51. Thus, as depicted, the indexer detents (only one shown) are nearer the projectile's base than the engraved portion which is closer to the fuzed nose 52.

When the gunner drops Fig. 12's mortar projectile 51 into the muzzle end of rifled mortar barrel 53, base end first, the rear positioned self-aligning indexer detent 28a registers with a rifling groove (not shown) in that barrel. Automatic alignment of the forward pre-engraved projectile portion 24'—25' then follows in exactly the manner earlier described and shown (Figs. 1 to 11) in the case of breech loading firearms and ammunition therefor.

*Alternative construction for indexer detents*

As earlier intimated, a number of alternative indexer detent constructions are possible in addition to the "button" type which Figs. 1 to 12 hereof show. Two of these, respectively referred to as "leaf spring" and "resilient ear," will now be described.

The "leaf spring" form of detent is shown by Figs. 13-14-15-16 to comprise a leaf spring 28b secured at one of its ends in a recess 57 by a crimp or spot weld as shown at 58. This spring projects from recess 57 which together with the spring coincides with a spiral extension of an engraved projectile tooth 25. This spiral also matches the helical gun barrel riflings (one groove of which is represented by the dotted lines in Fig. 13).

From the earlier given explanation of my indexer button's operation, the automatic registry made possible by this spring indexing device will be obvious. Spring 28b compresses as does button 28 upon striking a land 33, (see Fig. 16a) and later re-extends to engage a rifling groove 34 (see Fig. 16b). Function and result thus are the same as for the "button" indexer detents 28 of Figs. 1 to 12.

The "resilient ear" form of alternative indexer detent construction is shown in Figs. 17-18 at 28c—28'c. This modification is particularly useful in projectiles (smaller sizes and others) where the removable nose portion joins the projectile body at a diameter only slightly less than the body's maximum. It consists of a washer 61 of resilient material, such as spring steel or phosphor-bronze, fastened into the Fig. 17 position by simply screwing into place the fuzed nose 66.

This washer 61 is ring-shaped, having a hollow central opening equivalent in size to the diameter of the projectile's mouth 67 into which the fuzed nose 66 is screwed. One or more indexing "ears" 28c—28'c protrude radially from this washer 61 as shown by Figs. 17-18. Once the proper rotative positioning of these indexer ears 28c is determined (for correct engravings-to-rifling registry), the washer can there be rotatively fixed by conventional "keying" means.

One such keying arrangement uses a dowel pin (not shown) in the end face of projectile mouth 67 to receive a matching hole in washer 61. In another keying method that is shown by Figs. 17-18, the washer 61 has therein a depression 69 which mates with a hole 71 in the projectile mouth's end face.

The operation of this "resilient ear" indexer is also based on the earlier described method underlying use of my "button type" indexer facilities (Figs. 1 to 12). The springy projections 28c—28'c collapse into the tapered margin 72 of the projectile's forward body portion upon striking a rifling land (not shown). Re-extension to enter a rifling groove next occurs upon continued forward axial movement of the projectile in the gun barrel. The tapered margin 72 permits this compression of indexing projections 28c—28'c below the circumference of the projectile, thereby avoiding jamming of the indexer ears against the barrel's lands.

Summary

Still other constructions for the projectile's indexer detents 28 are of course possible. Basic requirements to be met are that each installed detent member be aligned spirally with one of the projectile's pre-engraved teeth; that it be sufficiently spaced axially from the pre-engravings to assure registry with a rifling groove before the pre-engravings have been advanced to the barrel's loading end; and that it have such radial resilience as to yield inwardly when a rifling land is first encountered and then spring outwardly again when registry with a rifling groove has been established.

Any form of construction which satisfies the foregoing may be applied either to breech loading projectiles where the indexer detents are positioned ahead of the pre-engravings or to muzzle loading projectiles where the indexer detents are positioned behind the pre-engravings.

In fact, pre-engraved objects other than projectiles may have their entrance into spirally grooved bores other than firearms barrels facilitated by the indexer detent facilities which have been invented by me as described herein. In all such applications (firearms ammunition and other) the process of self-alignment will be entirely automatic and completely independent of former requirements for rotative manipulation.

Speaking of firearms uses only, it will be evident that my herein disclosed improvements have extended the utility and simplified the use of pre-engraved projectiles in rifled weapons of all types; have simplified the insertion of pre-engraved projectiles into the rifled barrels of both breech loading and muzzle loading firearms; have diminished the effort and time required to effect such insertion; have made pre-engraved projectiles more readily useable in rifled weapons of the automatic reloading type; and have imparted to pre-engraved projectiles the capability of engaging a gun's rifling in instantaneous alignment and without necessitating special rotative manipulation.

With possibly minor changes that will not depart from the spirit and intent of my invention, the new self-indexing facilities here described may be applied to any pre-engraved projectile or the like that is intended for use in a rifle gun barrel or other equivalent tube. My inventive improvements are therefore extensive in their adaption and are not to be restricted to the specific form here disclosed by way of illustration.

I claim:

1. In combination, a tubular bore interiorly rifled with spiral lands and grooves, a cylindical member for passage through said bore having pre-engraved grooves and teeth registerable with their complementary counterparts in the bore's rifling and exteriorly encircling said member towards the end thereof that is last to enter said bore when the member is axially inserted thereinto, and an indexing detent resiliently protruded radially from said cylindrical member astride a continuation of the helical line of one of the member's said pre-engraved teeth and so spaced axially from that tooth as to precede same into said bore upon said axial insertion of the cylindrical member into the bore whereby then to engage with one of said bore's spiral rifling grooves and by following in that groove so to rotate the cylindrical member during further axial advancement thereof into the bore as automatically to bring that member's said pre-engraved grooves and teeth into accurate registry with said bore's rifled lands and grooves.

2. In combination, a gun barrel interiorly rifled with spiral lands and grooves, a projectile for firing from said barrel having pre-engraved grooves and teeth registerable with their complementary counterparts in the barrel's rifling and encircling said projectile towards the end thereof that is last to enter said barrel during loading, and an indexing detent mounted on said projectile astride a continuation of the helical line of one of the projectile's pre-engraved teeth and in such axially spaced relationship to that tooth as to precede same into the barrel during loading, said indexing detent being there resiliently protruded radially from the projectile for engagement with one of said barrel's spiral grooves upon axial thrusting of the projectile into said barrel whereby the resultant following of said detent in said groove then so rotates the projectile as automatically to bring the projectile's said pre-engraved grooves and teeth into accurate registry with said barrel's rifled lands and grooves.

3. In combination, a gun barrel interiorly rifled with spiral lands and grooves, a projectile for firing from said barrel having pre-engraved grooves and teeth registerable with their complementary counterparts in the barrel's rifling and encircling said projectile towards the end thereof that is last to enter said barrel during loading, and an automatic indexing detent radially protruded from said projectile astride a continuation of the helical line of one of the projectile's said pre-engraved teeth and in such axially spaced relationship to the tooth as to precede same into the barrel during loading, said detent being there resiliently mounted to permit inward radial compression when said projectile is first axially thrust into said barrel but outwardly expanding into a spiral barrel groove upon initial registry therewith and thereafter following said groove during further axial advancement of the projectile into the barrel whereby then so to rotate the projectile as automatically to bring the projectile's said pre-engraved grooves and teeth into accurate registry with said barrel's rifled lands and grooves.

4. In combination, a gun barrel interiorly rifled with spiral lands and grooves, a projectile for firing from said barrel having pre-engraved grooves and teeth registerable with their complementary counterparts in the barrel's rifling and encircling said projectile toward the end thereof that is last to enter said barrel during loading, and an automatic indexing detent radially protruded from said projectile astride a continuation of the helical line of one of the projectile's said pre-engraved teeth and in such axially spaced relationship to that tooth as to precede same into the barrel during loading, said detent being there resiliently mounted to permit inward radial compression when said projectile is first axially thrust into said barrel and remaining so compressed upon passage over one of the barrel's said spiral lands but outwardly expanding into an adjacent spiral barrel groove upon initial registry therewith and thereafter following said groove during further axial advancement of the projectile in the barrel whereby then so to rotate the projectile as automatically to bring the projectile's said pre-engraved grooves and teeth into accurate registry with said barrel's rifled lands and grooves.

5. In combination, a breech-loading gun barrel interiorly rifled with spiral lands and grooves, a projectile for firing from said barrel having pre-engraved grooves and teeth encircling the rear portion thereof and registerable with their complementary counterparts in the barrel's rifling, and an indexing detent mounted at the forward portion of said projectile astride a continuation of the helical line of one of the projectile's said pre-engraved teeth and there resiliently protruded radially from the projectile for engagement with one of said barrel's spiral grooves upon forward axial thrusting of the projectile into the breech end of said barrel whereby the resultant following of said forward detent in said groove then so rotates the projectile as automatically to bring the projectile's said rearward pre-engraved grooves and teeth into accurate registry with said rifled lands and grooves at said barrel's breech end.

6. In combination, a muzzle loading gun barrel interiorly rifled with spiral lands and grooves, a projectile for firing from said barrel having pre-engraved grooves and teeth encircling the forward portion thereof and registerable with their complementary counterparts in the barrel's rifling, and an indexing detent mounted at the rear portion of said projectile astride a continuation of the helical line of one of the projectile's said pre-engraved teeth and there resiliently protruded radially from the projectile for engagement with one of said barrel's spiral grooves upon rearward axial thrusting of the projectile into the muzzle end of said barrel whereby the resultant following of said detent in said groove then so rotates the projectile as automatically to bring the projectile's said forward pre-engraved grooves and teeth into accurate registry with said rifled lands and grooves at said barrel's muzzle end.

7. In a projectile for firing from the rifled barrel of a breech loading gun, the combination of pre-engraved grooves and teeth encircling said projectile towards the rearward end thereof and registerable with spiral lands and grooves in said barrel's rifling, and an indexing detent resiliently protruded radially from said projectile towards the forward end thereof and astride a continuation of the helical line of one of the projectile's said rear pre-engraved teeth whereby to engage with one of said barrel's spiral rifling grooves upon forward axial thrusting of the projectile into said barrel and by following in said groove then so rotate the projectile as automatically to bring the rear pre-engravings thereon into accurate registry with said barrel's rifling.

8. In a projectile for firing from the rifled barrel of a muzzle loading gun, the combination of pre-engraved grooves and teeth encircling said projectile towards the forward end thereof and registerable with spiral lands and grooves in said barrel's rifling, and an indexing detent resiliently protruded radially from said projectile towards the rearward end thereof and astride a continuation of the helical line of one of the projectile's said forward pre-engraved teeth whereby to engage with one of said barrel's spiral rifling grooves upon rearward thrusting of the projectile into the muzzle end of said barrel and by following in said groove then so rotate the projectile as automatically to bring the forward pre-engravings thereon into accurate registry with said barrel's rifling.

9. In combination, a rifled cylindrical member and a tube having a rifled bore adapted so as to enable the respective riflings to become registered one with the other when the cylindrical member is inserted into the tube, and resilient means separate and independent of the teeth and grooves of both the said rifled member and rifled tube adapted to cooperate therewith by yielding so as not to cause interference when said member is moved axially within and relative to said tube, but capable of functioning as an indexing device to cause meshing register between riflings of cylindrical member and the riflings of the tube when said member is axially inserted into the tube.

10. In a projectile for firing from the rifled barrel of a gun, the combination of pre-engraved grooves and teeth encircling said projectile towards the end thereof and registerable with the spiral lands and grooves in said barrel's riflings, and an indexing detent mounted on said projectile astride a continuation of the helical line of one of the projectile's pre-engraved teeth and in such axially spaced relationship to that tooth as to precede same into the barrel during loading, said indexing detent being there resiliently protruded radially from the projectile for engagement with one of said barrel's spiral grooves upon axial thrusting of the projectile into said barrel whereby the resultant following of said detent in said groove then so rotates the projectile as automatically to bring the projectile's said pre-engraved grooves and teeth into accurate registry with said barrel's rifled lands and grooves.

CLARENCE WALTON MUSSER.

REFERENCES CITED

The following references are of record in the file of this patent:

UNITED STATES PATENTS

| Number | Name | Date |
| --- | --- | --- |
| 45,898 | Berdan | Jan. 10, 1865 |
| 182,278 | Hotchkiss | Sept. 19, 1876 |
| 1,548,818 | Bijur | Aug. 11, 1925 |
| 1,602,037 | Mixsell | Oct. 5, 1926 |

FOREIGN PATENTS

| Number | Country | Date |
| --- | --- | --- |
| 4,926 | Great Britain | Mar. 29, 1890 |
| 306,405 | Germany | Feb. 20, 1920 |